United States Patent Office 3,101,582
Patented Aug. 27, 1963

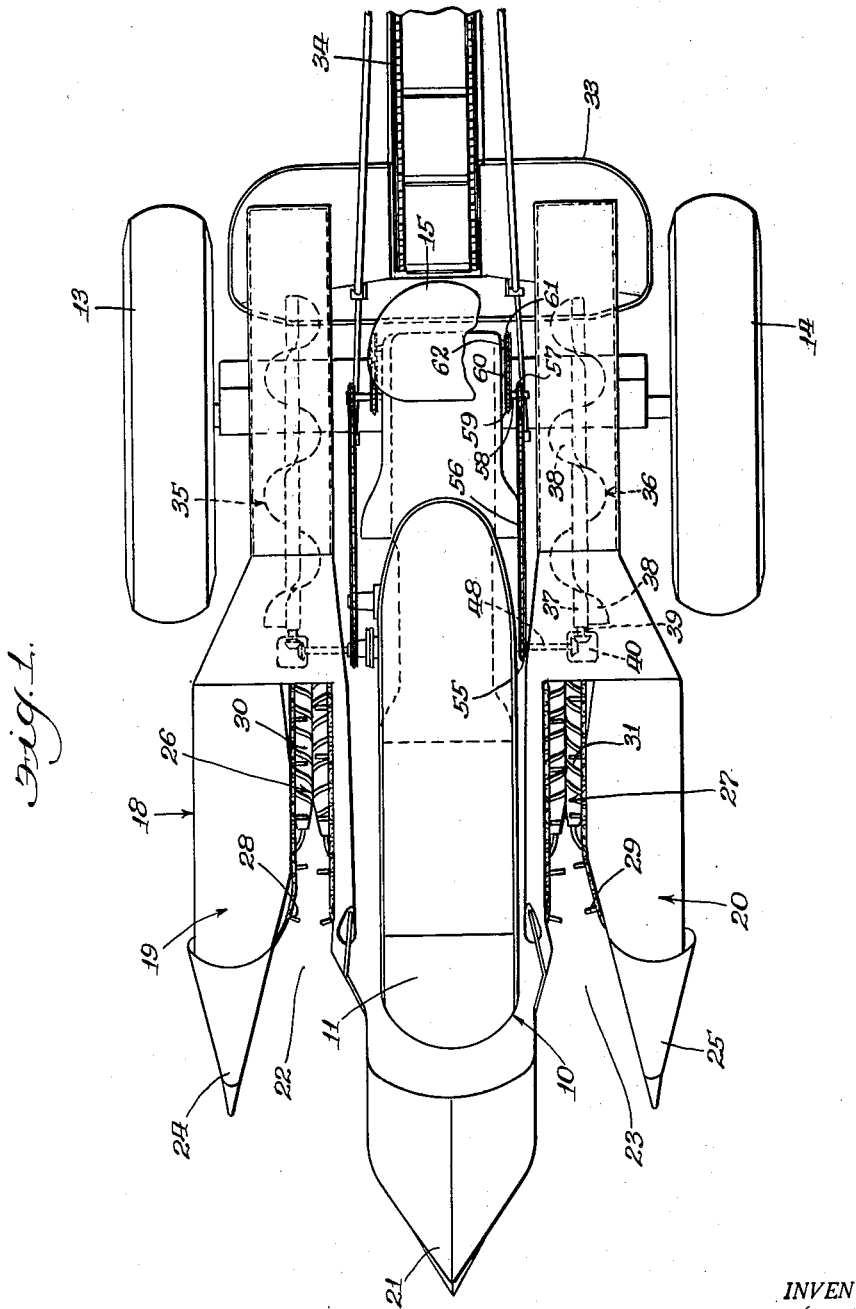

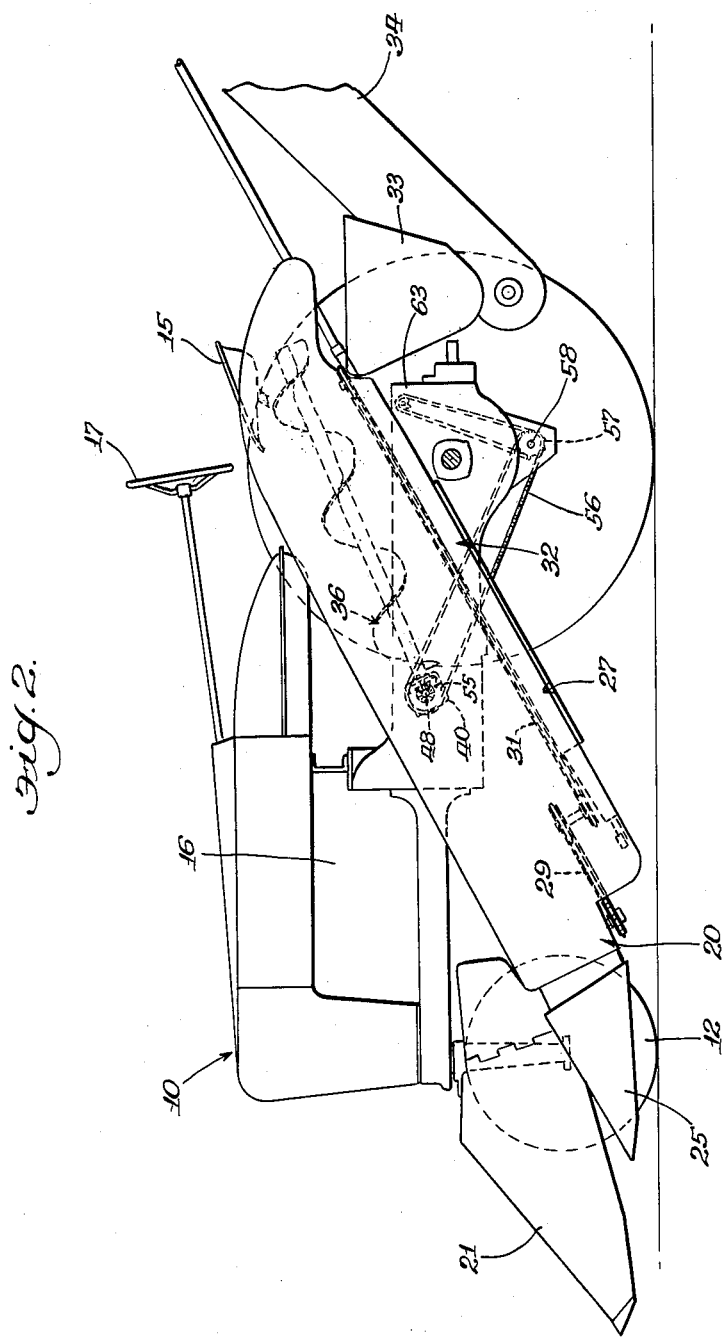

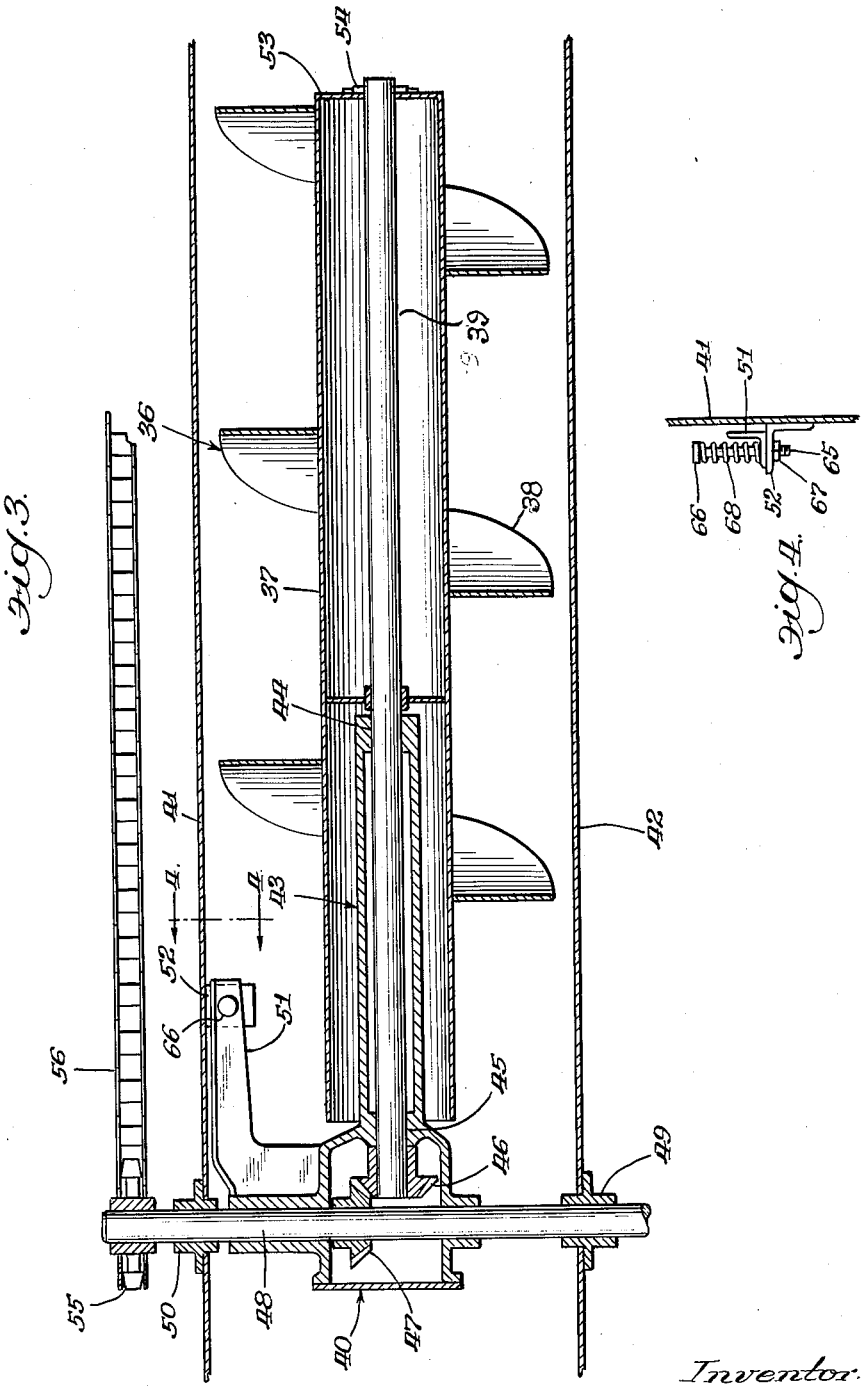

3,101,582
OPEN END AUGER FEED OVER INCLINED ROLLS
Benjamin M. Hyman, East Moline, Ill., assignor to International Harvester Company, Chicago, Ill., a corporation of New Jersey
Continuation of application Ser. No. 781,320, Dec. 18, 1958. This application June 13, 1960, Ser. No. 35,843
4 Claims. (Cl. 56—104)

This invention relates to a new and improved corn picker and is a continuation of my application filed December 18, 1958, having Serial No. 781,302, and now abandoned.

Basically, corn pickers or harvesters as they are often called employ cooperative snapping rolls to effect a snapping of the ears of corn from the stalks on which they are growing. These snapping rolls are mounted on a mobile vehicle which is propelled through a field of standing corn. Following snapping of the ears the ears are usually husked and this also is customarily accomplished with cooperative rolls usually made of different materials and having different surface conformations. The relative positioning of the snapping rolls and husking rolls in corn pickers has varied throughout a great range. There is then the problem of conveying ears of corn through the machine following harvesting or snapping from the stalks. The corn must first be guided into the picker, whereupon it is snapped and then conveyed to the husking rolls or bed, as it is usually called, and thence it must be conveyed to a point of collection for subsequent or immediate transmittal to a trailing wagon or some other depository. The efficiency of corn pickers thus varies with the type of conveying system for the corn within the picker. Many types and forms of conveyors and elevators have been employed in corn pickers to increase the efficiency in flow of corn through the machine to gain a minimum of congestion.

It is thus a principal object of this invention to provide an ear corn conveyor over upwardly and rearwardly inclined rolls of a corn picker.

Another important object of this invention is the provision of an open end auger disposed generally over upwardly and rearwardly inclined rolls of a corn picker and having its open end disposed adjacent the discharging end of the inclined rolls.

Another and further important object of this invention is to supply a floating auger conveyor disposed substantially in the upwardly and rearwardly inclined direction of the cooperative rolls of a corn picker and spaced thereabove to effect a movement of the ears of corn along said rolls and the auger being capable of yielding upwardly depending upon the quantity of corn within the picker.

Still another important object of this invention is to equip a corn picker having cooperative husking rolls with an auger conveyor extending lengthwise of the husking rolls and arranged to be journally mounted at one end thereof and rotatably driven at that end and being non-supported or unjournalled at its discharge end substantially coincident with the ends of the husking rolls and further arranged and constructed to swing about its journalling supporting end whereby the discharge end may be swung toward or away from the husking rolls depending upon the quantity of corn on the inclined rolls.

Another and still further important object of this invention is to provide a corn picker in which there is included upwardly and rearwardly inclined cooperative snapping rolls and continuations thereof constituting husking rolls also inclined upwardly and rearwardly and having conveyor means disposed above the husking rolls to convey ears of corn snapped by the snapping rolls over and along the husking rolls and continuing the movement of the ears of corn to be husked and the husked ears upwardly over the husking rolls to a wagon elevator hopper at the rear of the picker.

Still another important object of this invention is the provision of means in a corn picker having longitudinally disposed upwardly and rearwardly inclined husking rolls for conveying ears of corn over the husking rolls and capable of accommodating various quanities of corn on the inclined rolls and positively feeding the ears of corn rearwardly to a depository for subsequent delivery to a trailing wagon or the like.

Another and still further important object of this invention is to provide upwardly and rearwardly inclined husking rolls having an auger conveyor disposed substantially centrally thereover and extending longitudinally of the rolls with a journal support adjacent the forward ends of the husking rolls and the auger conveyor being non-supported, that is, unjournalled, at the location of the upper rearward discharge end of the husking rolls whereby ears of corn passing thereover may be fed upwardly by the auger conveyor to a depository for the harvested and husked ears of corn at the rear of the implement.

Other and further important objects and advantages will become apparent from the disclosures in the following specification and accompanying drawings.

In the drawings:

FIG. 1 is a top plan view of a corn picker having the auger conveyor of this invention incorporated therein;

FIG. 2 is a side elevational view of the device of FIG. 1;

FIG. 3 is an enlarged detailed view of the auger conveyor.

FIG. 4 is a sectional view taken on the line 4—4 of FIGURE 3.

As shown in the drawings, the reference numeral 10 indicates generally a tractor of the type having a longitudinally extending narrow body 11 with steerable wheels 12 supporting the forward end thereof and relatively widely spaced-apart ground-engaging traction wheels 13 and 14 supporting the rearward end thereof. An operator's seat 15 is supplied at a position between the traction wheels 13 and 14 and just rearwardly of the engine 16 which constitutes a major part of the elongated body member 11. A steering wheel 17 is positioned proximate to the operator's seat 15 and enables the operator to effect a turning of the dirigible wheels 12 to thereby steer the tractor.

The tractor just described is known generally as a tricycle type farm tractor and is adapted to receive various implements mounted thereon or various implements which may be pulled thereby. The present invention although applicable to all types of corn pickers is for convenience shown on a tractor-mounted corn picker. The corn picking implement is identified generally by the numeral 18 and is of the type capable of harvesting two adjacent rows of corn. The picker 18 is equipped with spaced-apart picker units 19 and 20 flanking the longitudinally extending body 11 of the tractor 10. A center divider or deflector member 21 is disposed around the front end of the tractor 10 and is employed to guide the standing stalks into the gathering or picking units 19 and 20 and more particularly into the throats 22 and 23 formed by spaced-apart divider points 24 and 25 which are positioned outwardly from the center divider 21. Pairs of cooperative snapping rolls 26 and 27 are inclined upwardly and rearwardly in the picker units 19 and 20 and are arranged to engage the standing stalks of corn. The rolls 26 and 27 rotate inwardly and downwardly along their adjoining sides and thus the stalks are pulled downwardly between the rolls to finally effect a snapping of the ears of corn from the stalks. The standing corn stalks are further guided into the snapping rolls by a fingered conveyor 28 on the gathering unit 19 and a similar fingered conveyor 29 mounted on the gathering unit 20. The stalks are continued in their rearward movement after they are gripped by the snapping rolls by reason of fingered chain conveyors 30 and 31 on the gathering units 19 and 20, respectively. The fingered chain conveyors 30 and 31 in addition to positively moving the stalks rearwardly act to carry the snapped ears of corn upwardly and rearwardly along the surface of the inclined snapping rolls. The inclination of the snapping rolls is clearly shown in FIG. 2 as is also the close proximity of the fingered chain conveyors 30 and 31 disposed immediately thereabove and extending from the forward ends of the snapping rolls to the rearward ends thereof and even beyond the snapping rolls to a position over the husking rolls. The snapping rolls, as shown in FIG. 2, extend upwardly and rearwardly as stated and the upper rearward ends constitute husking rolls 32. The husking rolls 32 are in axial alignment with the snapping rolls 26 and 27 and generally form upward continuations thereof. However, the surface materials on the husking rolls are generally different from the surface materials of the snapping rolls and similarly the surface conformations employed on the husking rolls is also generally different from the surface conformations on the snapping rolls inasmuch as it performs the function of stripping the husk from the ear rather than the different type of function required by the snapping rolls in knocking the ear from the stalk by reason of pulling the stalk through the rolls. It is desirable to maintain the surface of the husking rolls free of corn and other debris and thus in addition to the fingered conveyors 30 and 31 passing thereover a special conveyor element is arranged above the husking portions of the rolls to thereby maintain the rolls clean and positively deliver the husked ears rearwardly to a receiving hopper 33 which extends across the rear end of the tractor-mounted corn picker. The hopper combines the harvest of corn from both gathering units 19 and 20 for subsequent delivery to a centrally disposed wagon elevator 34 which is arranged and constructed to carry the ears of corn upwardly and rearwardly for deposit in a trailing wagon or the like.

The special conveyor positioned above the husking rolls is an auger conveyor shown at 35 for the gathering unit 19 and at 36 for the gathering unit 20. For convenience, we shall only describe one of the auger conveyors in detail. It should be understood that the gathering units 19 and 20 are symmetrical about a center line through the tractor and that both contain the same operating elements. The auger conveyor 36 has a central core 37 and screw flight spirally wound thereon as shown at 38. A shaft 39 is disposed centrally of the core 37 and is affixed thereto. The shaft 39 is journally carried in a gear box 40 at the charging end of the auger conveyor and is adapted to impart rotational drive thereto to effect rotation of the auger 36, whereupon material over the inclined rolls will be delivered upwardly and rearwardly to a position adjacent the receiving hopper 33 whereupon the crop material drops down into the hopper and is delivered to a trailing wagon by means of the elevator 34. The upper or discharging end of the auger is free and non-supported and the lower journalled end has a hinge mounting so that as the material on the inclined rolls builds up the auger will automatically ride thereover. Similarly, when there is a lesser amount of material on the inclined rolls the auger drops downwardly to effect a proper feed of the corn rearwardly to the receiving hopper 33. It will thus be apparent that the auger conveyors 35 and 36 are both capable of accommodating various amounts of harvested crop.

The detail construction of the auger conveyor which floats vertically at its free non-supported or unjournalled end about its journal support is shown in FIG. 3. Generally the auger conveyor 36 is closely confined between laterally spaced side walls 41 and 42 of the gathering unit 20 so that the area directly above the husking rolls is substantially filled. The gear casing 40 includes a sleeve-like member 43 extending into the core 37 of the auger 36. The spaced ends of the sleeve 43 include inwardly projecting annular flanges 44 and 45 which constitute spaced bearing supports for the internal auger shaft 39. A bevel gear 46 is fixedly attached to the shaft 39 within the gear casing 40 and is in meshing engagement with a corresponding bevel gear 47. The mating bevel gear 47 is mounted on a transversely disposed shaft 48. The shaft 48 is journalled in bearings 49 and 50 mounted respectively in the side walls 42 and 41 of the gathering unit adjacent the husking roll portion of the corn picker. The gear casing 40 is provided with an arm 51 which is employed to limit the downward swinging movement of the auger conveyor 36 by its engagement with a stop element 52 mounted on the side wall 41 of the gathering unit.

As best shown in FIG. 4, the stop element 52 is in the form of an angle member which carries a substantially vertically disposed bolt 65. The bolt 65 has an enlarged head 66 and is fastened to the element 52 by a nut 67. The bolt shank passes upwardly through a relatively large opening in the arm 51. A coil spring 68 surrounds the shank of the bolt 65 between the surface of the arm 51 and the head 66 of the bolt. It should be apparent that as greater quantities of corn are fed beneath the auger conveyor 36 over the husking bed that the auger conveyor will be permitted to rise against the action of the spring 68 about the shaft 48 as a hinge center at its receiving or charging end adjacent the receiving part of the inclined rolls and thus readily accommodate varying quantities of corn to effectively feed any of these varying quantities. The upper free discharging end of the auger conveyor 36 is closed as shown at 53 and has a locking pin or the like 54 passing transversely through the central shaft 39 to thereby lock the core 37 onto the internal shaft 39. The upper discharging end of the auger 36 located at the discharging end of the inclined rolls and the receiving hopper is thus non-supported and free to ride up or down depending upon the quantity of corn on the husking rolls and is limited in its arcuate movement in its downward extent by reason of the stop 52 being engaged by the limiting arm 51 formed integrally with the gear housing 40. The upward limit of the auger is determined by the length of the bolt 65 and the spacing of the head 66 thereof above the fixed stop 52. The opening in the arm 51 as previously stated is large enough to permit the arm to ride loosely over the upstanding bolt 65 against the active end of the coil spring 68.

Drive to the shaft 48 is accomplished through a sprocket 55 affixed to the end thereof and this is rotatably driven by means of a chain 56. The chain 56 is driven by a sprocket 57 which in turn is mounted on a shaft 58. The shaft 58 carries another sprocket 59 which is joined by a chain 60. The chain 60 is driven by a sprocket 61 mounted on a drive shaft 62 projecting laterally from a gear housing 63 of the tractor. The other elements of the corn picker which are driven have not been shown in detail, nor have the drives to these elements been shown or described inasmuch as they form no part of the present invention. The remainder of the corn picker is substantially the same as pickers currently on the market and hence it should be understood that the invention is directed to the floating auger conveyor means over the husking bed to cause the corn thereon to be positively delivered upwardly and rearwardly for deposit into the receiving hopper for final delivery to a trailing wagon or the like.

In the operation of this invention, the corn picker traverses a field of standing corn whereupon the corn is guided into the gathering units 19 and 20 through their throats 22 and 23, respectively, whereupon the stalks are taken by the gathering chains 28 and 29 to the snapping rolls 26 and 27. The chains 30 and 31 now come into action to continue the rearward pulling of the stalks while they pass between the cooperative snapping rolls 26 and 27. The snapping rolls turn inwardly and downwardly at their mating surfaces and hence cause the stalks to be pulled downwardly therebetween. The ears of corn on the stalks are eventually snapped by reason of the continued downward pulling of the stalks between the closely associated rollers and thereupon the fingered chains 31 carry the snapped ears of corn upwardly and rearwardly where the ears are treated by the husking rolls. In the present instance the husking rolls are shown as continuations of the snapping rolls. As the ears of corn pass over the husking rolls, the rolls cause a pulling of the husks from the ears and there is then the need for controlling these ears of corn and positively moving the ears rearwardly to the receiving hopper 33 regardless of the amount of corn on these inclined rolls. Therefore the augers 35 and 36, which have been previously described as journalled at their lower ends and non-supported or unjournalled at their upper ends, do perform that function merely by riding the surface of the inclined rolls and rising when more corn is on the rolls and lowering when a lesser amount is present on the the rolls. As earlier described, as downward limit stop 52 is provided to prevent the augers from riding directly on the inclined rolls.

I am aware that numerous details of construction may be varied throughout a wide range without departing from the principles disclosed herein and I therefore do not propose limiting the patent granted hereon otherwise than as indicated by the appended claims.

What is claimed is:

1. A conveyor for corn pickers of the type having upwardly and rearwardly inclined snapping rolls and upwardly and rearwardly inclined husking rolls constituting continuations of said snapping rolls, and said husking rolls having ears of corn delivered thereto from said snapping rolls comprising an auger conveyor positioned above and generally upwardly and rearwardly over said husking rolls and arranged and constructed to feed ears of corn thereover, said auger conveyor being journally mounted at its lower forward end thereof adjacent the lower forward end of said husking rolls, said auger conveyor being non-supported at its upper rearward discharge end, drive means coupled to said auger conveyor through the journal mounting, and said drive means and said journal mounting comprising a hinge mounting about which the auger conveyor may arcuately swing.

2. A device as set forth in claim 1 in which there is included cooperative stop means to limit the proximity of the auger conveyor with the inclined rolls.

3. A conveyor for corn pickers of the type having upwardly and rearwardly inclined rolls comprising an auger conveyor positioned above and generally upwardly and rearwardly over said rolls and arranged and constructed to feed ears of corn thereover, said auger conveyor being journally mounted at its lower forward end, said auger conveyor being non-supported at its upper rearward discharge end, means for driving said auger conveyor through the journal mounting, and hinge means, including said journal mounting, for enabling arcuate displacement of said non-supported end of the auger conveyor to accommodate different volumes of ears of corn.

4. A material elevating conveyor comprising means defining an inclined surface, an auger mounted over said inclined surface and disposed generally parallel thereto, said auger being journally mounted at its lower end in said means and non-supported at its upper end, drive means coupled to said auger through said journal mounting, and said drive means and said journal mounting comprising a hinge about which the auger may arcuately swing.

References Cited in the file of this patent

UNITED STATES PATENTS

| | | |
|---|---|---|
| 2,298,332 | Applegate | Oct. 13, 1942 |
| 2,525,058 | Andrews | Oct. 10, 1950 |
| 2,721,557 | Andrews et al. | Oct. 25, 1955 |